United States Patent [19]
Watkins

[11] Patent Number: 5,787,641
[45] Date of Patent: Aug. 4, 1998

[54] EXCESS WATER SHEDDING AND ROOT SHAPING PLANT CONTAINER

[76] Inventor: Marvin L. Watkins, 16960 Cypress Way, Los Gatos, Calif. 95032

[21] Appl. No.: 627,955

[22] Filed: Apr. 3, 1996

[51] Int. Cl.$^6$ ............................................. A01G 23/02
[52] U.S. Cl. ................................. 47/73; 47/65.6
[58] Field of Search .............. 47/73, 81, 1.01, 47/65.5, 65.6

[56] References Cited

U.S. PATENT DOCUMENTS

| D. 243,112 | 1/1977 | Gross | 47/73 R |
|---|---|---|---|
| 3,328,913 | 7/1967 | Vogt | 47/73 R |
| 4,107,876 | 8/1978 | Greenbaum | 47/73 R |
| 5,040,330 | 8/1991 | Belgiorno | 47/73 R |
| 5,327,679 | 7/1994 | Hawthorne | 47/73 R |
| 5,459,960 | 10/1995 | Manlove | 47/73 R |

FOREIGN PATENT DOCUMENTS

| 8352 | of 1894 | United Kingdom | 47/73 R |
|---|---|---|---|
| 1586781 | 12/1977 | United Kingdom | 47/73 R |

*Primary Examiner*—Michael J. Carone
*Assistant Examiner*—Joanne C. Downs

[57] ABSTRACT

An improved plant container (10) having a protrusion (20) with plates (42) is disclosed. A typical protrusion is shaped like the frustum of a cone. It is situated centrally at the bottom of the container. This arrangement creates an annular soil receiving space whose vertical cross section is roughly W-shaped. The plates are thin imperforate members placed radially between the protrusion wall (22) and container wall (12) (i.e. in the notches of the 'W'). This placement partitions the aforesaid space into open topped noncommunicating wedge shaped compartments (40).

A plant grown in such a container obtains several benefits:

1. The soil receiving space's shape causes soil to shed more excess water than does soil held in a conventional container.
2. The plates prevent growing roots from becoming convoluted as is typical for plants grown in a conventional container.
3. The compartments cause growing roots to form into lobes (80) which are easily spread out when transplanting.
4. Moreover, these lobes' wedge shape permits easy, non-injurious disentanglement of growing leaders from their thin extremities.

11 Claims, 7 Drawing Sheets

EXCESS WATER SHEDDING AND ROOT SHAPING PLANT CONTAINER

CONTENTS

1. Background
  1.1 Field of the Invention
  1.2 Description of the Prior Art
    1.2.1 Excess Water Reducing Prior Art
    1.2.2 Root Shaping Prior Art
    1.2.3 Miscellaneous Plant Container Prior Art
      1.2.3.1 Capillary Watering Systems
      1.2.3.2 Top Heavy Containers
      1.2.3.3 Snails and Slugs
    1.2.4 Summary Comments About Prior Art
2. Objects and Advantages
3. Description of Drawings
4. List of Reference Numerals
5. Excess Water Shedding Features
  5.1 Description—FIG. 1
  5.2 Operation—FIG. 1
    5.2.1 Empirical Data versus Theory of Operation
    5.2.2 Object (v)
    5.2.3 Objects (i) and (iii)
    5.2.4 Objects (ii) and (vi)
    5.2.5 Object (iv)
6. Root Shaping Features
  6.1 Description—FIG. 2
  6.2 Operation—FIG. 2
    6.2.1 Object (ix)
    6.2.2 Objects (vii) and (viii)
    6.2.3 Object (x)
  6.3 FIG. 3
7. Miscellaneous Features
  7.1 FIG. 4
  7.2 FIG. 5
  7.3 FIG. 6
  7.4 FIGS. 7A, 7B and 7C
  7.5 FIG. 8
    7.5.1 Object (xi)
  7.6 FIG. 9
    7.6.1 Object (xii)
    7.6.2 Object (xiii)
8. Summary
9. Conclusion, Ramifications and Scope of Invention
10. Claims
11. EXCESS WATER SHEDDING & ROOT SHAPING PLANT CONTAINER
  11.1 Abstract

1. BACKGROUND

1.1 Field of the Invention

The present invention relates generally to plant husbandry and, more particularly, to container devices which hold soil for the purpose of growing living plants.

1.2. Description of the Prior Art

Living plants that are grown for commercial sale, such as small trees and shrubs, are commonly grown in soil, or soil substitutes, held in containers. Compared with plants grown in the ground, container grown plants can be grown to marketable size quicker, they are more easily tended, they are more easily prepared and transported to market, and they can be successfully transplanted more often.

Water movement and retention characteristics of soil held in containers make it difficult to maintain a proper moisture level in the soil for many plants. It is well known that the soil held by a plant container may store less water than a plant being grown in it may need. Less well understood is that soil held by a plant container may readily store more water than is healthy for a plant. Both conditions harm a plant by causing it to wilt, and if persistent, eventually to die.

Growth characteristics of plants grown in containers can cause their root systems to become impaired. Impaired roots harm a plant by substantially reducing its vigor, vitality and subsequent growth.

The present invention is directed mainly at reducing harm to container grown plants caused by excess water stored in the soil and by misshapen root growth.

1.2.1 Excess Water Reducing Prior Art

Excess water deprives a plant's roots of necessary oxygen thereby suffocating and injuring the plant. Another serious problem with excess water is that it promotes fungi, algae and other pathogens that attack a plant's roots. Such attack causes injury and disease. In either case, injury to the roots reduces their ability to absorb water and nutrients from the soil. The plant weakens and wilts and, if the condition persists, eventually it dies.

At least the following types of excess water can exist in a container holding soil in which a plant is being grown:

(i) Capillary moisture being in soil that is beyond the reach of the plant's roots. This type of excess water occurs when a plant's root volume is smaller than the contained soil's volume.

(ii) Capillary moisture being in soil that is axially below the plant's stem and enveloped within the plant's roots. This type of excess water occurs for plants that extend their roots laterally but not vertically.

(iii) Capillary moisture being sustained at levels above that which the plant can use. This type of excess water typically occurs when a plant is watered too frequently.

(iv) Gravitational water flowing or seeping downward through the soil's pores. This type of excess water typically occurs when water is plentifully poured into a container.

(v) Water collecting in a saturated layer of soil adjacent the soil's lower boundary. This type of excess water occurs because boundary effects at a soil mass' surface restrain the movement of water across its surface.

(vi) Puddles accumulating on top of the container's floor. This type of excess water typically occurs when a container's floor/bottom has a depression and there is no drainage hole near the depression's nadir.

The following prior art inventions affect one or more of the above types of excess water:

(a) drainage holes in a plant container;

(b) using plant containers with volumes only slightly greater than a plant's root volume;

(c) ridges and grooves or a bulge in a plant container's floor;

(d) inventions like British Patent Nos. 8352 and 1,586,781, and U.S. Pat. Nos. Des. 243,112, 3,328,913, and 5,459,960;

(e) pebbles, gravel or similar objects placed on a plant container's floor; and (f) special soil mixtures and/or amendments.

Drainage holes (a) are the main prior art device whose specific intent is to eliminate excess water from a plant container. Drainage holes reduce gravitational (iv) excess water. They can reduce puddles (vi) if part of their opening lies within the depression causing the puddle. In either case, drainage holes reduce excess water by allowing it to escape. Drainage holes are ineffective against other types of excess water.

Using relatively small containers (b) reduces excess water in soil that is beyond the reach (i) of a plant's roots by the simple expedient of eliminating the soil. Notice however, that typical prior art plant containers do not reduce excess moisture found in the volume of soil existing axially below a plant's stem but within the span of it's roots (ii). As will be shown below, much prior art actually worsens this condition.

Floor ridges and grooves or a bulge (c) can, but need not, eliminate puddles (vi) from the floor of a plant container and can, but need not, reduce the saturated layer (v) at the bottom of the soil. Some rectangular plant containers have narrow, shallow ridges or grooves molded into their floors. Some cylindrical plant containers have a shallow bulge centered on their otherwise flat floors. These devices are intended to direct water towards drainage holes and/or to strengthen the plant container's floor. These devices are generally too small to affect any other type of excess water.

British Patent No. 8352 (d) discloses a plant container having an inverted pot placed within the plant container's soil receiving space. This device is meant to facilitate growing orchids. British Patent No. 1,586,781 discloses a plant container having a central raised protrusion with base apertures. This device is meant to capture condensation moisture and deliver it to the soil. U.S. Pat. No. Des. 243,112 discloses a plant container having an ornamental pentagonal protrusion placed centrally within the container. The purpose of this device is not clear from the patent disclosure. U.S. Pat. No. 3,328,913 discloses a complex plant container apparatus having a hollow transparent insert projecting through the container's floor. This device is meant to allow viewing a plant's roots. U.S. Pat. No. 5,459,960 discloses a plant container having a complex central protrusion with an apical aperture. This device is meant to capture and air prune a plant's tap root. Each of these inventions would eliminate some forms of excess moisture, primarily that occurring in soil in the lower central volume of a container (ii). However, because these inventions are directed at solving container plant growing problems other than that of reducing excess water, their efficacy at shedding excess water is deficient.

Placing pebbles, gravel or similar objects (e) on the floor of a plant container has little positive effect. Placing such objects on the floor of a plant container can separate soil from puddles (vi). This can reduce saturation of soil (v) by puddles. Conversely, the presence of pebbles or gravel can separate soil from a highly absorptive container material such as red clay. In this case, pebbles or gravel can decrease the amount of water absorbed from the saturating layer (v) by the container material. While widely promoted in books and magazines as a means for increasing "drainage" in a plant container, pebbles and such are ineffective against excess water.

Potting soil mixtures (f) can be formulated from highly porous to highly water retentive. When highly porous they reduce the amount of water retained in the soil. When highly water retentive they increase the amount of water retained in the soil. Potting soil mixtures are usually formulated to favor water retention over porosity. Such soils exacerbate excess water problems.

1.2.2 Root Shaping Prior Art

Growing a plant in a container can impair the plant's root system. Confinement in a container causes a plant's roots to be substantially reduced in extent and molded into a disabling shape compared with their natural field grown state. Restricted and misshapen roots harm a plant by substantially reducing its vigor, vitality and subsequent growth. Such harm can be permanent because these effects may not be overcome by a plant when it is transplanted into a larger container or into the ground.

At least the following types of impairments can exist because a plant is or was being grown in a container holding soil:

(vii) A plant's roots are deflected from their normal radially outward path. This condition occurs when a plant's roots encounter a container's walls. Typically, roots begin to grow along the inner surface of the container.

(viii) A plant's roots become coiled and convoluted. This disabling impairment occurs when a plant is grown in the same container so long that its roots become longer than the circumference of the container.

(ix) Dysfunctionally shaped root system. This impairment is caused by a plant's roots being molded into the shape of the container, typically a tall cylinder.

(x) Unequal distribution of roots around a plant stem's circumference. This impairment is caused by root dominance interactions being exacerbated by a container's confinement of roots to a small common volume.

The following prior art inventions affect one or more of the above impairments:

(h) successively transplanting a plant into larger containers;

(i) combing or teasing out tangles in a plant's roots;

(j) scoring a plant's root ball;

(k) pruning a plant's root ball;

(l) inventions like U.S. Pat. Nos. 4,442,628 and 4,497,132;

(m) inventions like U.S. Pat. Nos. 4,939,865 and 5,099,607; and (n) inventions like U.S. Pat. Nos. 3,328,913, 5,040,330, 5,327,679, and 5,459,960; and (o) plant container interior surface coatings (U.S. Patent Pending).

Regular transplanting of a plant into successively larger containers (h) is the main prior art means to prevent root impairment. Plants grown in containers usually exhibit some coiling roots despite regular transplanting, so transplanting is usually accompanied by some corrective measures as well. Combing (i), scoring (j) and pruning (k) roots are the main prior art means used to correct root impairment. Transplanting, combing, scoring and pruning roots can be used to treat deflected (vii) and/or coiling (viii) roots. The more serious the impairment the more severe the treatment adopted to correct it. The more severe treatments effectively nullify the main benefits that containerized plant culture is intended to confer, namely: an intact, healthy, undamaged root system ready for transplanting.

U.S. Pat. Nos. 4,442,628 and 4,497,132 (l) disclose containers wherein circling roots (vii, viii) are trapped by vertical openings in the sides of the container and are air pruned there. Because roots are trapped by such devices removing a plant from such a container can be difficult and may result in the loss of the roots' growing tips.

U.S. Pat. Nos. 4,939,865 and 5,099,607 (m) disclose flat sheets which can be formed into cylinders wherein the sheets are composed of perforated recesses intended to trap extending roots (vii, viii) and air prune them. The sheets must be carefully pulled away from the plant's roots to minimize injury to the plant's roots. Further, these inventions lack floors and so plants grown in them must be transplanted into other suitable containers for shipment. The labor involved to remove plants from these containers and prepare them for market makes these inventions impractical for large numbers of small plants. The root manipulation needed to prepare such plants can cause root injury as well.

U.S. Pat. No. 5,040,330 (n) discloses a perforated Y-shaped root separator structure. This device is meant to form root clusters that can be spread apart at transplanting. However, the thick pie-shaped opening would resist flexing, and serious root injury could occur when roots growing through the perforations were pulled free. U.S. Pat. No. 3,328,913 and U.S. Pat. No. 5,459,960, as described above, would not prevent or inhibit any of impairments (vii) to (x) described above. U.S. Pat. No. 5,327,679 discloses a plant container having hollow legs formed between transverse ridges molded into the floor. This device is meant to train growing roots into divergent clumps. This invention would improve impairments (viii) and (x). However, each leg's large upper opening would form a relatively inflexible clump while its thick bottom would preclude non-injurious extraction of root growing tips.

Coating the interior surface of a plant container (o) (U.S. Patent pending) is a recent invention directed at preventing root circling (vii, viii). Roots stop growing when they near the toxic paint coating. However, applying the coating is labor intensive and it must be reapplied regularly.

Evidently, there is little prior art directed specifically towards dysfunctionally misshapened roots (ix) nor towards unequal distribution of roots (x). Plants with dysfunctionally misshapened roots exhibit slow growth to an ultimately diminished size and are difficult to transplant successfully. Plants with large crowns, for example trees and large shrubs, and an unequal distribution of roots become unbalanced and top heavy with age. They often require staking or wiring to support them against toppling over. Such support mechanisms are labor intensive to put in place and to maintain, they are unsightly and they are failure prone.

1.2.3 Miscellaneous Plant Container Prior Art

Additional problems associated with growing plants in containers are:

(xi) Capillary watering systems exacerbate the collection of excess water in the saturated layer that forms at the lower boundary of a soil mass.

(xii) Plants in containers often become top heavy and easily upset.

(xiii) Plants in containers are often attacked by snails.

1.2.3.1 Capillary Watering Systems

Insufficient water causes a plant to wilt and wither. It also prevents a plant's roots from absorbing nutrients from the soil. Drought severely weakens plants and when prolonged, eventually kills them. Inventions that seek to prevent plant injury and death due to insufficient water have been the subject of considerable inventiveness.

U.S. Pat. Nos. 3,557,490, 3,739,523, 3,786,598, 4,117,631, 4,117,632, 4,231,187, 4,236,352, 4,250,665, 4,324,070, 4,389,815, 4,527,354, 4,829,709, 4,932,159, 4,996,792, 5,081,790, 5,099,609, 5,111,614, 5,125,184, 5,129,183, 5,136,806, 5,193,305, 5,341,596 disclose inventions that introduce water into the soil using capillary action. At least some part of the transport mechanism, typically a wick, contacts soil on or near the soil mass' lower boundary. Such devices exacerbate the collection of excess water in the saturated layer that forms there and sustain higher levels of soil moisture than is desirable. Furthermore, they generally cause a moisture gradient to exist in the soil which is unhealthy for most plants.

U.S. Pat. Nos. 3,557,490, 3,739,523, 3,786,598, 4,117,632, 4,389,815, 4,829,709, 5,129,183, 5,136,806 further disclose structures that extend upwardly into the soil at the center of the container. In each case, these devices are means for introducing water into the soil. In general, the water transport mechanism is a wick. In general, they are designed to introduce water into the soil through the volume of soil immediately adjacent the soil's lower boundary and axially under a plant's stem. Such devices exacerbate the collection of excess water in the region axially below a plant's stem and sustain higher levels of soil moisture than is desirable. Furthermore, they generally cause a moisture gradient to exist in the soil which is unhealthy for most plants.

1.2.3.2 Top Heavy Containers

Plants in containers often become top heavy. Top heavy plants are easily upset during winds or when bumped by laborers, customers or gardeners. Plants being transported to market are especially likely to fall over during the jouncing of transit. Impacts caused by falling over can fracture a plant's root ball and/or break branches and top growth. Pruning a plant's crown is the main prior art means of correcting top heaviness. U.S. Pat. No. 5,125,184 discloses a plant container jacket designed in part to prevent its container from tipping over. However, this device is complex, mainly directed at wick watering, and no doubt expensive to manufacture.

British Patent Nos. 8352 and 1,586,781, and U.S. Pat. Nos. Des. 243,112, 3,328,913, and 5,459,960 disclose devices that have downwardly opening hollows. In general, these devices are too shallow and their manufacture too weak to allow them to be used as support shaft receptacles. U.S. Pat. No. 5,327,679 discloses a plant container having transverse ridges molded into the floor. However, such ridges could not hold a shift and thereby prevent the container from toppling.

1.2.3.3 Snails and Slugs

Plants in containers are often attacked by snails. Damage to plants is at least very disfiguring and occasionally causes a plant's death.

1.2.4 Summary Comments About Prior Art

In practice, simple containers having drainage holes have been coupled with the following process to make container grown plant culture very successful.

Commercial growers generally place a plant into a well-drained container with a soil volume only slightly larger than the plant's existing root volume. A regimen of watering and fertilizing is instituted that both encourages growth and seeks to maintain an average moisture level between drought and drowning. After the plant's roots have grown sufficiently to fill the soil volume, the plant is removed from its container. The roots are then scored and pruned commensurate with the amount of root deflection and coiling present. Then, the plant is replanted into a larger container. This cycle is repeated until the plant reaches marketable size. The plant is then prepared and shipped to market, typically a retail nursery, where it is maintained until sold to a customer. Typically, after purchase a customer transplants the plant into the ground.

While successful, this process exhibits many deficiencies. The typical container provides only drainage holes to protect against excess water caused injury and nothing to protect against impairments caused by root confinement. The transplanting process is labor intensive, usually involves deliberate injury to a plant and poses substantial risk of complete loss of the plant.

Because transplanting is labor intensive and injures plants, plant growers are motivated to keep plants in their present containers as long as possible. But plants grown in the same container for too long a time become root-bound. Root-bound plants experience stunted growth, are difficult to transplant successfully and are difficult to maintain successfully.

The closer a new container's volume is to a plant's existing root volume, the more frequent will be the need for transplanting. Further, using relatively smaller containers eliminates soil that would otherwise act as a plant's moisture reservoir. Without this reservoir a plant must be watered more frequently and is significantly more likely to experience drought caused injury. So in this case, drought damage risks increase, labor costs for transplanting increase, and transplant injury costs increase. These risks and costs motivate a grower to move plants into substantially larger containers. In this case, excess water caused injury risks increase.

2. OBJECTS AND ADVANTAGES

Accordingly, several objects and advantages of the present invention are:

(i) to provide a plant container that reduces capillary moisture occurring beyond the reach of a contained plant's roots;

(ii) to provide a plant container that eliminates capillary moisture occurring axially under a contained plant's stem;

(iii) to provide a plant container that reduces capillary moisture occurring because a plant is too frequently watered;

(iv) to provide a plant container with conventional drain holes;

(v) to provide a plant container that reduces the volume of soil adjacent its lower boundary which is subject to saturation;

(vi) to provide a plant container that eliminates puddles;

(vii) to provide a plant container that localizes root combing to a plant's root tips and that eliminates entirely the need for root scoring;

(viii) to provide a plant container that prevents root circling, coiling and convoluting;

(ix) to provide a plant container that shapes a plant's roots so that it can be set shallowly in the ground and its roots easily splayed out horizontally;

(x) to provide a plant container that promotes more dominant roots and distributes them evenly about a plant's stem;

(xi) to provide a plant container with an elevated wick position and a wick shield which together avoid introducing moisture into the soaking prone volumes of soil lying adjacent a soil mass' bottom boundary and axially under a plant's stem;

(xii) to provide a plant container with a means to support the plant and container against being upset.

(xiii) to provide a plant container with a means to reduce snail damage.

Further objects and advantages are to provide a plant container which can hold a substantially larger volume of soil relative to a contained plant's root volume while simultaneously reducing the likelihood of excess water caused injury; and in which a plant can be grown for a substantially longer time without causing the plant to become root-bound; and which therefore reduces the need for and frequency of transplanting plants from smaller to larger containers. Yet further objects and advantages are to provide a plant container which shapes a plant's roots so that their growing tips can easily and without major injury be splayed out flat in a receiving planting hole; which thereby causes a plant's roots to establish themselves rapidly and effectively after transplanting; and which therefore promotes plant vigor and vitality after transplanting. Still further objects and advantages will become apparent from a consideration of the ensuing description and drawings.

4. LIST OF REFERENCE NUMERALS

10 Container
12 Container side wall
13 Container base
14 Container drain hole
15 Container top
16 Protrusion/Container juncture
16A Protrusion/Container synclinal juncture
16B Protrusion/Container trough juncture
18 Container base opening
20 Protrusion
22 Protrusion side wall
23 Protrusion base
24 Protrusion drain notch
25 Protrusion trough drain hole
26 Protrusion hollow
28 Protrusion base opening
30 Protrusion apex
32 Protrusion apex cup
34 Protrusion apex drain groove
40 Compartment
42 Plate
44 Plate slot
46 Drain tent
50 Wick
52 Wick aperture
54 Wick notch
56 Wick notch seating surface 57 Wick notch positioning guide
80 Root lobe
82 Root slot
84 Root juncture
90 Support shaft

5. WATER SHEDDING FEATURES

Figure 2:
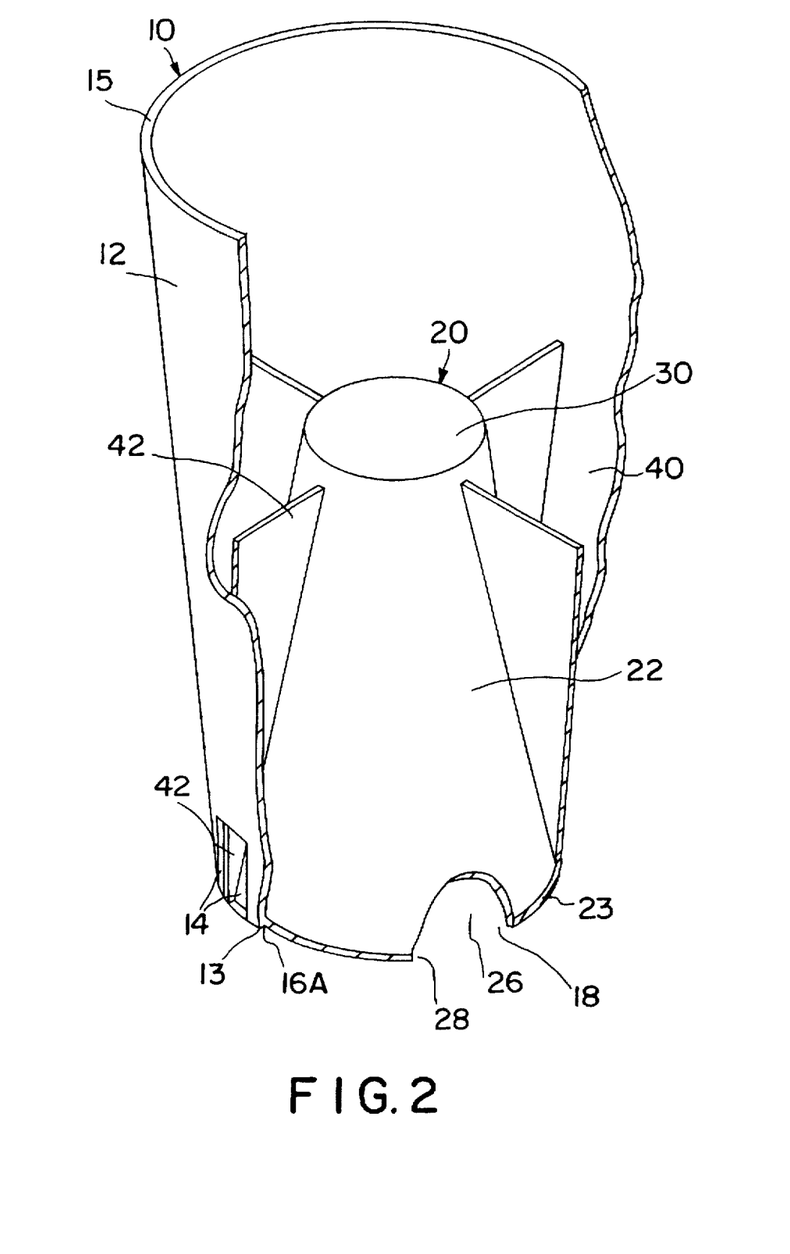
FIG. 2 is a top perspective view in partial section of a plant container having both protrusion and root shaping compartments.

A preferred embodiment of a plant container having a device which implements the excess water shedding and root shaping functions of the present invention is illustrated in FIG. 2. For clarity and ease of exposition, the features implementing the excess water shedding function will be discussed separately from those implementing the root shaping function.

Figure 1:
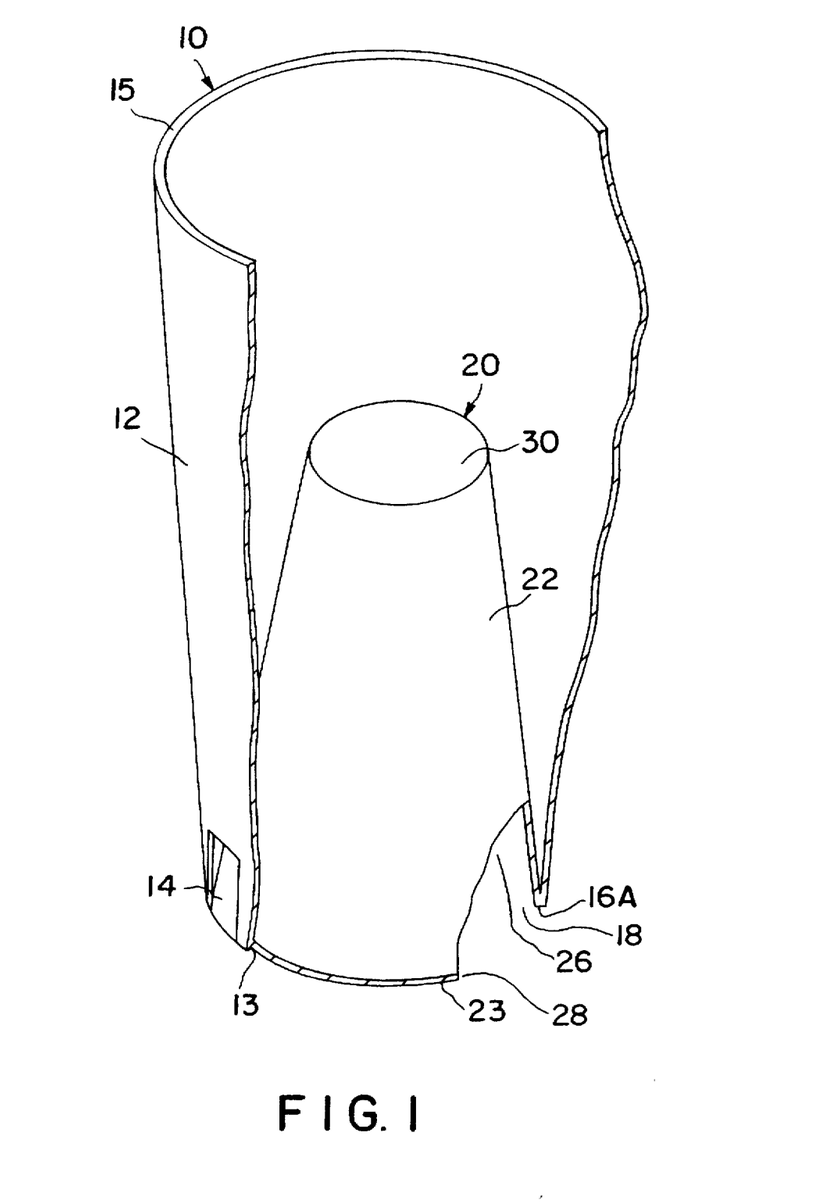
FIG. 1 is a top perspective view in partial section of a plant container having an excess water shedding protrusion.

5.1 Description—FIG. 1

FIG. 1 shows that the excess water shedding function can be implemented with a container 10 and a protrusion 20. Informally, FIG. 1 shows an otherwise typical plant container modified only in that it has an arched or vaulted floor. The vaulted floor appears as though it is a smaller, upside down container molded into the bottom of the container. The design is such that turning the embodiment of FIG. 1 upside down yields a container like device.

Formally, FIG. 1 shows container 10 has the shape of an inverted frustum of a cone: a planar circular base 13, a planar circular open top 15, and a continuous side wall 12. Because container 10 is an inverted frustum, base 13's diameter is smaller than top 15's diameter, so that side wall 12 slopes upwardly and outwardly from base 13 to top 15. A plurality of drain holes 14 penetrate side wall 12 adjacent to base 13. Drain holes 14 are arranged symmetrically around the circumference of side wall 12.

FIG. 1 shows protrusion 20 has the shape of a frustum of a cone: a planar circular open base 23, a planar circular closed apex 30, and a continuous side wall 22. Because protrusion 20 is a frustum, base 23's diameter is larger than apex 30's diameter, so that side wall 22 slopes upwardly and inwardly from base 23 to apex 30.

Container 10's floor is made up of container base 13 and protrusion 20. Container 10's open base 13 together with protrusion 20's upward projection into container 10's interior forms container base opening 18.

Protrusion 20 is preferentially integrally formed or molded with container 10 so that they are a single unit. In this case, protrusion 20 is preferentially hollow, as shown in FIG. 1 at 26. This enables protrusion base opening 28 into protrusion hollow 26 to create a downwardly opening receptacle. (See discussion in sections "FIG. 8" and "FIG. 9" below). Protrusion side wall 22 and container side wall 12 join at juncture 16A which defines their common base. Therefore protrusion base 23 and container base 13 are one and the same feature, as shown in FIG. 1.

A soil excluding space is defined by protrusion 20. The volume of the inverted frustum defined by container side wall 12 defines a virtual receiving space for container 10. A soil receiving space is defined for container 10 as this virtual receiving space less the soil excluding space. In other words, the soil receiving space defined for container 10 is: radially inside container side wall 12, above juncture 16A, radially outside and above protrusion side wall 22, and above protrusion apex 30. Similarly, protrusion base opening 28 and container base opening 18 are also one and the same feature.

Protrusion 20 projects a substantial distance into container 10's virtual receiving space. Equivalently, the height of protrusion apex 30 is a significant fraction of the height of container 10. The height of protrusion apex 30 is generally set a predetermined distance below the top of container 10.

In a particular typical embodiment: container 10 has height, top 15 diameter and base 13 diameter dimensions of 23 cm×15.5 cm×13 cm, respectively; and protrusion 20 has height, apex 30 diameter and base 23 diameter dimensions of 12.5 cm×5 cm×13 cm, respectively; and drain hole 14 has height and width of 1.5 cm×2 cm, respectively. There are four drain holes 14 arranged symmetrically around container 10's circumference adjacent base 13.

FIG. 1 shows container 10 and protrusion 20 having particular shapes. However, the intent of a protrusion, with respect to the excess water shedding function, is to impose certain characteristics on the shape of a plant container's receiving space, namely: (a) the receiving space should be restricted to the periphery in the lower portion of container 10; and (b) this peripheral ring like lower portion of the receiving space should taper downwardly. In other words, a protrusion 20 creates a semiconstricted receiving space which excludes soil from a volume in the lower central portion of its container's 10 receiving space. And, a protrusion 20 creates a lower boundary for the volume in which soil can reside such that a vertical cross section through a radius has an approximately V-shape.

Thus, any similar upwardly and inwardly projecting shape having a substantial height could be used for a protrusion. Alternate embodiments could use protrusions shaped like: a cone, a pyramid, the frustum of a pyramid, a hemisphere, a zone of one segment of a sphere, a zone of two segments of a sphere, an upwardly projecting convexity, or two or more of any of the above shapes used in combination.

Similarly, a container with arbitrary horizontal cross section can be used. The shape of a protrusion base's periphery should be similar to the shape of its associated container's receiving space periphery. In FIG. 1, container 10 has a circular base 13 and top 15 and so protrusion 20 also has a circular base 23 and apex 30. For an alternate embodiment using a square container, the preferred shape for a protrusion would be as the frustum of a pyramid.

FIG. 1 shows a preferred fabrication method with plant container 10 and protrusion 20 integrally molded from an opaque plastic material. Possible plastic materials that could be used in alternate embodiments include polypropylene, polyethylene, styrofoam, various fibrous materials, various compressed organic materials, etc. Possible formable materials include ceramics, wood, metal, glass, etc.

5.2 Operation—FIG. 1

A protrusion's purpose is to impose on its associated container's receiving space a shape which causes soil contained therein to shed more excess water than does soil held in a conventional plant container.

Herein, a conventional plant container is one having an unconstricted receiving space or, equivalently, any plant container with a flat or nearly flat floor. An excess water shedding plant container is, of course, a plant container having a protrusion, such as container 10 with protrusion 20 of FIG. 1.

5.2.1 Empirical Data versus Theory of Operation

Empirical measurements show that when a fixed volume of water is slowly poured onto a fixed volume of soil held in a plant container, a plant container having a protrusion sheds significantly more water than does a conventional plant container. In other words, soil held by a plant container having a protrusion retains significantly less moisture than does a comparable conventional or flat floored plant container. For moderately wet soil an excess water shedding plant container sheds approximately 20% more water on average than a comparable conventional plant container while for moderately dry soil an excess water shedding plant container can shed up to 100% more water than a conventional plant container.

While the empirical evidence alone suffices to demonstrate the usefulness and value of a plant container having a protrusion, theories explaining the empirical observations have been devised. They are presented below in the context of the excess water type to which they apply. Be advised that while I think the following models are reasonably correct, I do not wish to be bound to these theories as the basis for a protrusion's efficacy.

As described in "Background" above, there are six types of excess water that can exist in a plant container. A plant container 10 having drain holes 14 and protrusion 20 eliminates or significantly reduces all six of these excess water types as described below. For clarity and ease of exposition, the order of consideration of reduction means will differ somewhat from the order of definition of excess water types.

5.2.2 Object (v)

A plant container with a protrusion, such as container 10 with protrusion 20 of FIG. 1, will substantially reduce saturating water that collects in a layer of soil adjacent a soil mass' lower boundary (v) compared with a conventional plant container.

By construction, a protrusion eliminates most of the space or volume adjacent the flat floor of a conventional plant container. Further, a protrusion has a sloped wall on which water cannot collect. The model below shows that these features imply that a protrusion eliminates most of the soil in a plant container which is subject to boundary saturation.

Soils are comprised of particles. Most soils are composed of different types of particles, sand, silt, clay and organic matter, with widely varying quantities of each type distributed arbitrarily through their volume. Soils with large particles have large pores and are easily penetrated by water but store relatively little moisture. Such soils are labeled porous with sand being a prime example. Soils with small particles have small pores and resist penetration by water but store considerably more moisture. Such soils are labeled dense with clay being a prime example.

Soils hold moisture because water is attracted to its particles. This attraction is generally capillary in nature. Capillary attraction causes water to form moisture films around a soil's particles. These films consume the space between particles, that is, films fill in a soil's pores. Porous soils have relatively weak capillary attraction forces. Dense soils have relatively strong capillary attraction forces.

Water moves through the pores between soil particles. Water moves in soil because of gravity and capillary attraction. Gravity causes water to move downward from higher places to lower ones. Capillary attraction causes moisture to move from places with greater moisture concentrations to ones with lesser concentrations because places with less moisture tend to have stronger capillary attraction than places with more moisture.

Taken altogether, variability in a soil's composition implies that it will exhibit variability in porosity which, in turn, implies that it will exhibit variability in moisture concentrations and variability in capillary attraction.

At the boundary of a mass of soil, local capillary forces are unbalanced. They combine to exert a net inwardly attractive force on water molecules at the surface of a soil mass. This inwardly directed force impedes moisture from moving across the soil mass' boundary. In particular, water moving downward within the soil under the pull of gravity is restrained at the soil's lower boundary by these unbalanced capillary forces.

Some of this restrained water collects or pools adjacent the lower boundary and thereby creates a saturated layer there. The depth of this saturated layer, i.e. the water level's height above the soil's lower boundary, depends primarily on the strength of the capillary attraction forces of the soil's constituent particles. Thus, for a given type of soil this layer's depth will be a constant, say h. In other words, excess gravitational water collects to a height h above a contained soil mass' lower boundary, regardless of the number, location or size of drain holes present in the container.

The fact that the saturation zone has a constant depth for a given soil, can be exploited to reduce the volume of soil that is subject to such saturation. This is accomplished by the present invention by creating a stricture in the container that reduces the volume of soil existing adjacent the soil mass' lowest boundary.

A conventional plant container typically has a flat floor. Thus, for a given soil its saturation zone is a thin disk of height h adjacent to and covering the container's entire floor area. An excess water shedding plant container has a floor shaped like a protrusion. For FIG. 1 embodiment's syncline terminated stricture, created by the syncline juncture of the protrusion and container wall, the saturation zone is a thin V-shaped annulus of height h lying on the container floor's circumference.

It is easy to see that a thin annulus on the outer edge of a disk has less volume than the entire disk. Simple calculations show that the volume of soil subject to lower boundary saturation is significantly reduced by a protrusion. In the particular typical embodiment described above, the volume of soil subject to saturation may be reduced by 90% to 98%, depending on soil water retention properties (i.e. the saturation depth h).

In summary, when water is poured into a container it primarily flows downward under the pull of gravity. Some water is absorbed by the soil, some water escapes through drain holes in the container, and some water collects just above the soil mass' lower boundary. The water collecting above the soil mass' lower boundary saturates a thin layer of soil adjacent this boundary. Because a protrusion substantially reduces the volume of soil subject to saturation, it substantially reduces the amount of saturating water in an excess water shedding plant container compared with a conventional plant container.

5.2.3 Objects (i) and (iii)

A plant container with a protrusion, such as container 10 with protrusion 20 of FIG. 1, will reduce capillary moisture that is beyond the reach of a plant's roots (i) and that is caused by too frequent watering (iii) compared with a conventional plant container.

Empirical observations show that capillary moisture is reduced in soil held in an excess water shedding plant container compared with soil held in a conventional plant container. Since all capillary moisture is reduced, capillary moisture beyond the reach of a plant's roots is reduced. Because an excess water shedding plant container holding wet soil retains less water as capillary moisture than does a comparable conventional plant container it reduces excess water caused by too-frequent watering.

The following model implies that capillary moisture is reduced in an excess water shedding container compared with a conventional container because a protrusion (nearly) eliminates soil's saturating layer adjacent its lower boundary.

Watering a plant growing in soil held in a plant container can be modeled using a three phase cycle. Each phase is defined with respect to the way in which water moves through the soil. The cycle is initiated by pouring water into the container from above. The first phase is dominated by gravity flow. The second phase is dominated by capillary lifting of water. The third phase is dominated by capillary dispersion.

The first phase begins when water is poured into the container. During the first phase water mostly flows downward under the pull of gravity. Some water is absorbed (i.e. held as capillary moisture), some collects just above the soil's lower boundary thereby saturating a thin layer adjacent this boundary, and the rest escapes through drain holes. During the second phase water mostly moves upward from the saturated layer adjacent the soil's lower boundary creating a persistent moisture concentration gradient from bottom to top, with the bottom being wetter and the top drier. During the third phase water moves omnidirectionally from greater concentrations to lesser concentrations causing the moisture gradient to dissipate and the soil to approach a uniform moisture concentration.

The first phase lasts for a few tens of seconds. The second phase lasts for a few hours to a few days or even a few weeks depending on the container, soil and plant. The third phase lasts until the plant container is watered again beginning the cycle anew or until all capillary water is consumed.

First phase dynamics were discussed in the section "Object (v)" above. In general, a plant container exits this phase with a thin layer of saturated soil adjacent its lower boundary. This layer acts like a small pool of water.

Second phase dynamics seem best explained by treating the container's soil as a bundle of vertical capillary tubes which are resting in a pool of water (i.e. saturated layer). The tubes have varying bore diameters (i.e. soil porosity) but constant height (i.e. soil depth). Smaller bore tubes exert greater capillary attraction forces than do larger bore ones and so lift water to a higher level than do larger bore tubes. Because there is a range of tube bores there is a range of levels to which water is lifted.

The existence of a moisture gradient is revealed by examining horizontal cross sections through the capillary tube bundle at successively higher levels. By construction, every tube exhibits some capillary attraction and every tube's base rests in the pool of water. Because tubes necessarily contribute moisture to all levels below the highest level to which they will lift water, each successively higher level has fewer tubes, or at most the same number of tubes, contributing moisture to it compared with the levels below it. This implies that the concentration of water at successively higher levels in the soil will become steadily less. That is, a moisture concentration gradient will exist. Furthermore, as long as there is water in the pool the water in the tubes will be replenished by capillary action and so the levels in the tubes will remain constant. This implies that the moisture gradient will persist as long as the pool exists.

So, a plant container exits this second phase if or when the saturated layer adjacent the soil's lower boundary is consumed.

Third phase dynamics seem best explained by treating the container's soil as an aggregate of capillary attraction loci which compete with one another for a limited supply of moisture. The loci have varying capillary attraction strengths (i.e. soil porosity) and moisture is consumed at arbitrary places in the soil (i.e. absorbed by plants).

Dry spots will begin to form near those loci from which water is being consumed. Their capillary attraction forces will therefore increase and cause moisture to migrate towards them from wetter regions. These will, in turn, become drier and therefore see an increase in their capillary strength. A horizontal cross section will now see more or less moisture depending upon how many dry spots it happens to intersect as well as its level. Because the number of dry spots depends on the random location of consumption points, the moisture gradient will become increasingly randomized. That is, it will appear to dissipate once the pool is depleted and soil moisture concentrations will then tend towards uniformity.

In summary, a plant container watered from the top exhibits a cycle with three phases of water behavior. The first phase is dominated by gravity flow, the second phase by capillary lifting of water and the third phase by capillary dispersion. Notice that the second phase is fundamentally predicated on the existence of a pool of water that induces a moisture gradient and generally higher capillary moisture concentrations compared with the third phase. This pool exists if and only if there is either a saturated layer adjacent the soil's lower boundary or there are puddles created by the container floor. Because a protrusion substantially reduces or eliminates both of these conditions, a plant container with this device essentially only cycles through the first and third phases. So, plant containers with protrusions will reduce excess water that is beyond the reach of a plant's roots and that is caused by too frequent watering compared with a conventional plant container.

5.2.4 Objects (ii) and (vi)

A plant container with a protrusion, such as container 10 with protrusion 20 of FIG. 1, will eliminate both moisture that is axially below a plant's stem (ii) and puddles (vi) that form on a container's floor.

A protrusion, by construction, excludes soil, roots and water from the volume it inhabits. Typically, this excluded volume is the central or axial region of a plant container from the protrusion apex downwardly to the container base. Because plants are usually placed with their stem aligned on or near the center axis of a container, moisture is eliminated from the space axially under a plant's stem.

Figure 5:
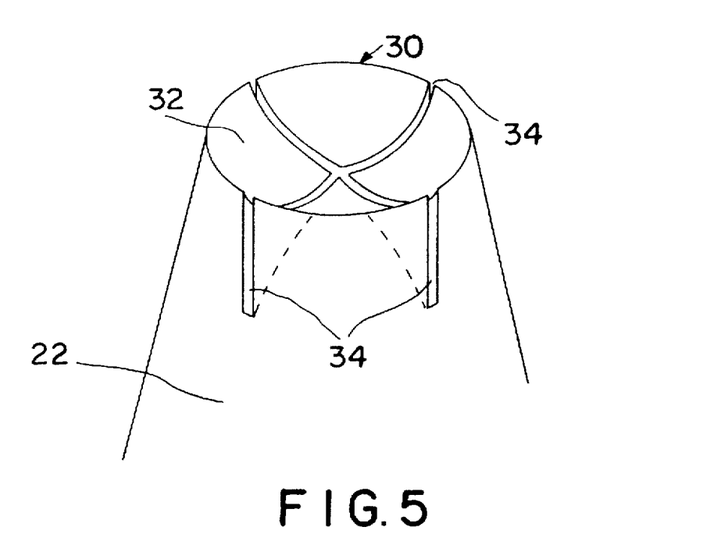
FIG. 5 is a top perspective partial view of a protrusion having an apex with cup shape and drain grooves.
Figure 6A:
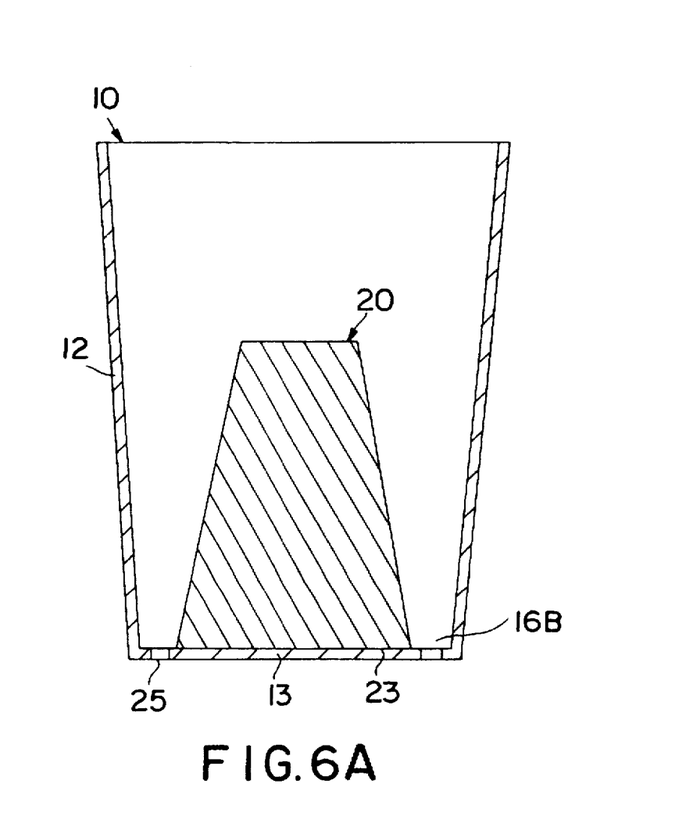
FIG. 6A is a side elevation section of a plant container having a removable/insertable solid protrusion and having a trough juncture.

A protrusion, by construction, has a sloped wall on which water cannot collect. The apex of the protrusion is sufficiently small and its height sufficiently great that water cannot easily collect above the apex. Because a contained plant is usually placed above the apex its roots further exclude soil and water from above the apex. In some alternate embodiments, as shown in FIG. 5, structural features such as a dome, cup or drain grooves are added to reduce any residual tendency for water to collect when a relatively small plant is placed in a relatively large container. In other alternate embodiments, as shown in FIG. 6A, drain holes in the annular base prevent water from collecting. Altogether, these imply that puddles are eliminated from a plant container with a protrusion.

5.2.5 Object (iv)

A plant container with drain holes, such as container 10 with protrusion 20 of FIG. 1, will eliminate gravitational water (iv).

It is expected that conventional drain holes will be used to allow gravitational water to escape from any plant container using a protrusion. Drain holes may: penetrate the side of container wall 12 as shown at 14 in FIG. 1, or penetrate the side of protrusion wall 22 as shown at 24 in FIG. 8, or penetrate the floor of protrusion/container trough juncture 16B as shown at 25 in FIG. 7B.

6. ROOT SHAPING FEATURES

A preferred embodiment of a plant container having a device which implements both the excess water shedding function and the root shaping function of the present invention is illustrated in FIG. 2.

6.1 Description—FIG. 2

FIG. 2 shows that a preferred embodiment of an excess water shedding and root shaping plant container is comprised of a container 10, a protrusion 20, and a plurality of plates 42.

The plant container of FIG. 2 has been enhanced, with respect to the plant container shown in FIG. 1, by adding a set of plates 42. Plates 42 partition the lower region of the soil receiving space into non-communicating open topped compartments 40 arranged circumferentially around protrusion 20.

In the embodiment of FIG. 2, each one of plates 42 has an approximately oblique triangular shape coinciding with the downwardly tapering shape of the lower portion of the receiving space. Each one of plates 42 has an innermost edge, an outermost edge, a top edge, and an angle at its lowermost point or base. Each one of plates 42 is situated vertically and aligned radially between container wall 12 and protrusion wall 22 and within container 10's receiving space. Each plate's 42 innermost radial edge is joined with protrusion 20's side wall 22. Each plate's 42 outermost radial edge is joined with container 10's side wall 12. Each plate's 42 height above base 23 is approximately the same as protrusion 20 apex 30's height. Each plate's 42 base angle is joined at juncture 16A with the join of protrusion base 23 and container base 13.

In the preferred embodiment of FIG. 2, plates 42 are symmetrically arranged around the circumference of protrusion 20. So, compartments 40 are of equal size and are symmetrically arranged around the circumference of protrusion 20 as well.

Similarly, drain holes 14 are symmetrically arranged around the circumference of container 10. Each plate 42 intersects a respective one of container side wall 12 drain hole 14. This arrangement is shown in greater detail in FIG. 7 below. Because each plate 42 intersects and divides a respective one of drain holes 14, each compartment 40 is penetrated by portions of two drain holes 14, one portion of a drain hole 14 at each end or corner of a compartment 40.

FIG. 2 shows a preferred fabrication method having plant container 10, protrusion 20 and plates 42 formed as a single unit. In this embodiment, protrusion 20 acts as a juncture member for plates 42. Plates 42 are rigid and of uniform thickness, so that they reinforce and strengthen protrusion 20. This is especially useful when protrusion 20 is hollow, as shown at 26. (See "Object (xii)" and "FIG. 8" below).

In a particular typical embodiment: container 10 has height, top 15 diameter and base 13 diameter dimensions of 23 cm×15.5 cm×13 cm, respectively. Protrusion 20 has height, apex 30 diameter and base 23 diameter dimensions of 12.5 cm×5 cm×13 cm, respectively. Plate 42 has height and thickness of 12 cm×0.2 cm, respectively. Drain hole 14 has height and width of 1.5 cm×2 cm, respectively. There are four drain holes 14 arranged symmetrically around container 10's circumference adjacent base 13. There are four plates 42 arranged symmetrically around protrusion 20 creating four compartments 40. Each of the four plates 42 bisects one of drain holes 14. In this case, protrusion base opening 28 and container base opening 18 are one and the same feature.

6.2 Operation—FIG. 2

A root barrier plate's purposes are: one, to create non-communicating compartments which prevent roots from growing circumferentially around the periphery of a plant container's soil receiving space; and two, to shape a plant's root system into multiple distinct lobes.

As described above, there are four types of root impairments that exist because a plant is grown in a container. A plant container 10 having a protrusion 20, root barrier plates 42, and drain holes 14 prevents or corrects all four of these as described below. For clarity and ease of exposition, the order of consideration of impairment mitigation means will differ somewhat from the order of definition of impairments.

6.2.1 Object (ix)

Figure 3:
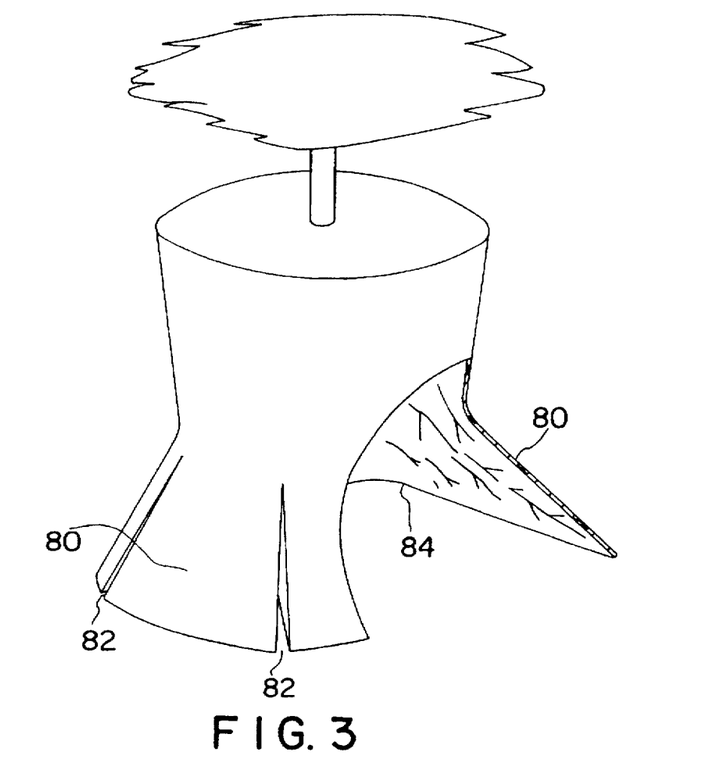
FIG. 3 is a top perspective view in partial section of a plant with a root system shaped into lobes.

A plant container with a protrusion and root barrier plates, such as container 10 with protrusion 20 and plates 42 of FIG. 2, will grow plants such that their root system is shaped into a plurality of wedge-shaped lobes. These lobes are shown in FIG. 3. Such a plant can be set shallowly and its roots splayed out horizontally (ix) when it is transplanted from container 10 into the ground.

Root barrier plates 42 separate the lower portion of the receiving space into non-communicating compartments 40. A given root growing outwardly from a plants, stem enters into at most one of compartments 40 and thereby becomes confined within it. Eventually the roots growing in each compartment will knit the soil together into cohesive units. When removed from the container of FIG. 2, these units appear as wedge-shaped root lobes, as shown at 80 in FIG. 3.

Having protrusion 20 be a frustum of a cone implies that apex 30 will have a small positive diameter. This causes root lobes 80 to be thinner at their juncture with the main root mass 84 than would be the case if either a conic or hemispheric shaped protrusion were used. Because a thinner juncture 84 makes lobes 80 more flexible, a frustum of a cone is a preferred shape for protrusion 20.

In one particularly nice embodiment, a set of several different sized plant containers is manufactured such that: (a) apex 30 of protrusion 20 is a fixed distance below the top of container 10 for all containers; and (b) apex 30 has a fixed diameter for all containers. This arrangement enables situating a plant at exactly the same soil depth when transplanting from a smaller to a larger container.

6.2.2 Objects (vii) and (viii)

A plant container with a protrusion and root barrier plates, such as container 10 with protrusion 20 and plates 42 of FIG. 2, will grow plants such that root combing is localized to a plant's root tips (vii), and will prevent a plant's roots from circling, coiling and becoming convoluted (viii).

Root barrier plates 42 separate the lower portion of receiving space into non-communicating compartments 40. A given root growing outwardly from a plants' stem enters into at most one of compartments 40 and thereby becomes confined within it. As the root continues growing it encounters one or more of the compartment's sides and is deflected to grow along it. Eventually the root growing tip approaches one of the two lower corners in each compartment 40.

A preferred embodiment of protrusion 20 with root barrier plates 42 positions each plate to intersect a drain hole 14. In this embodiment, each one of compartment's 40 corners have a drain hole. Thus, when a root approachs a compartment's 40 corner its growing tip approachs a drain hole 14 and so its growing tip will come into close proximity to air surrounding container 10.

Root tip proximity to air normally inhibits root tip growth, an effect sometimes referred to as air pruning. Such inhibited roots typically bud or divide somewhere back towards the stem and put out a new root tip there. This process repeats continuously as a plant grows and creates a ramified root system which is healthy and beneficial to the plant.

Further, root tangling is confined to a small region near the thin tip of the wedge-shaped lobe formed by a compartment 40. This section is easily combed out with minimum injury to remove the tangles. Because the roots are shaped into lobes 80 by compartments 40, there is no need to score the root ball to create separations in the roots.

6.2.3 Object (x)

A plant container with a protrusion and root barrier plates, such as container 10 with protrusion 20 and plates 42 of FIG. 2, will grow plants such that they have more dominant roots and these dominant roots are distributed more evenly about a plant's stem (x) than will a conventional plant container.

Root barrier plates 42 separate the lower portion of receiving space into non-communicating compartments 40. This reduces root competition, compared with a conventional container, because a dominant root confined to a single compartment 40 cannot contact a root in another compartment. So, a dominant root is less likely to inhibit roots growing in another compartment. So, each compartment is more likely to promote at least one root to dominancy. Because compartments 40 are symmetrically spaced around protrusion 20, such dominant roots will be fairly evenly distributed around a plant's stem.

Thus, after transplanting, a plant grown in a root shaping container will have root growth that is more evenly distributed and with major branches heading in different directions than will a plant grown in a conventional plant container. Evenly distributed roots anchor a plant better than does random root distribution, such as that produced by conventional plant containers.

6.3 FIG. 3

FIG. 3 shows the effect on a plant's root system of growing the plant in a plant container with a protrusion and root barrier plates similar to that shown in FIG. 2.

In FIG. 3, there is one root system lobe 80 for each compartment 40 shown in FIG. 2. Lobes 80 are separated by a root lobe slot 82. Lobe slots 82 are created by root barrier plates 42 as the plant's roots grow into compartments 40. Lobe 80 is thick near root juncture 84 and thin at its tip, corresponding to the tapering shape of compartment 40.

Lobes 80 can be flexed upwardly and outwardly with minimal damage to the roots themselves. In other words, lobes 80 can be splayed out horizontally when transplanted. Thus, such a plant can be set shallowly in the ground, at a depth corresponding to the soil depth above protrusion apex 30 in FIG. 2. This planting arrangement encourages a plant's roots to establish themselves quickly.

7. MISCELLANEOUS FEATURES

7.1 FIG. 4

Figure 4:
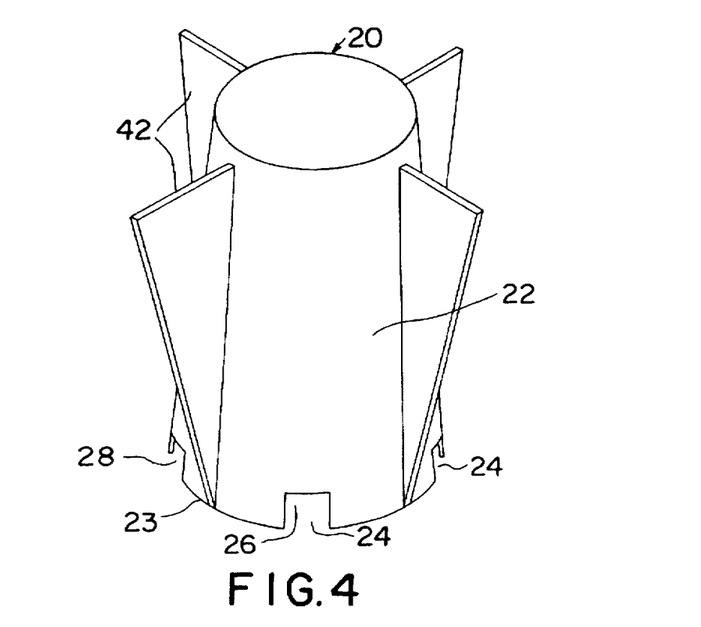
FIG. 4 is a top perspective view of a removable/insertable protrusion having root barrier plates.

A protrusion can be fabricated as a separate accessory that is insertable and removable. FIG. 4 shows an insertable and removable embodiment of protrusion 20. In this case, protrusion 20 base 23 would rest on the floor of an associated container's soil receiving space.

Figure 6B:
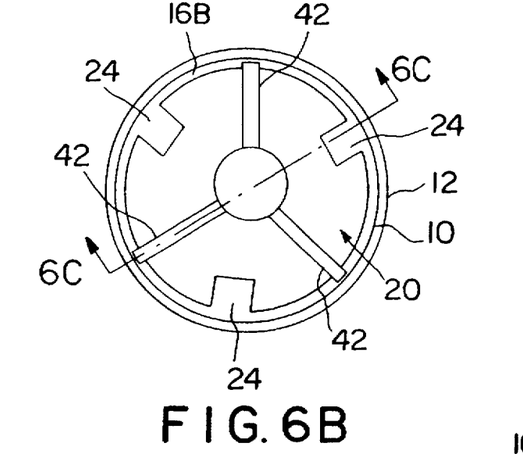
FIG. 6B is a top view of a plant container and a removable/insertable hollow protrusion with plates.
Figure 6C:
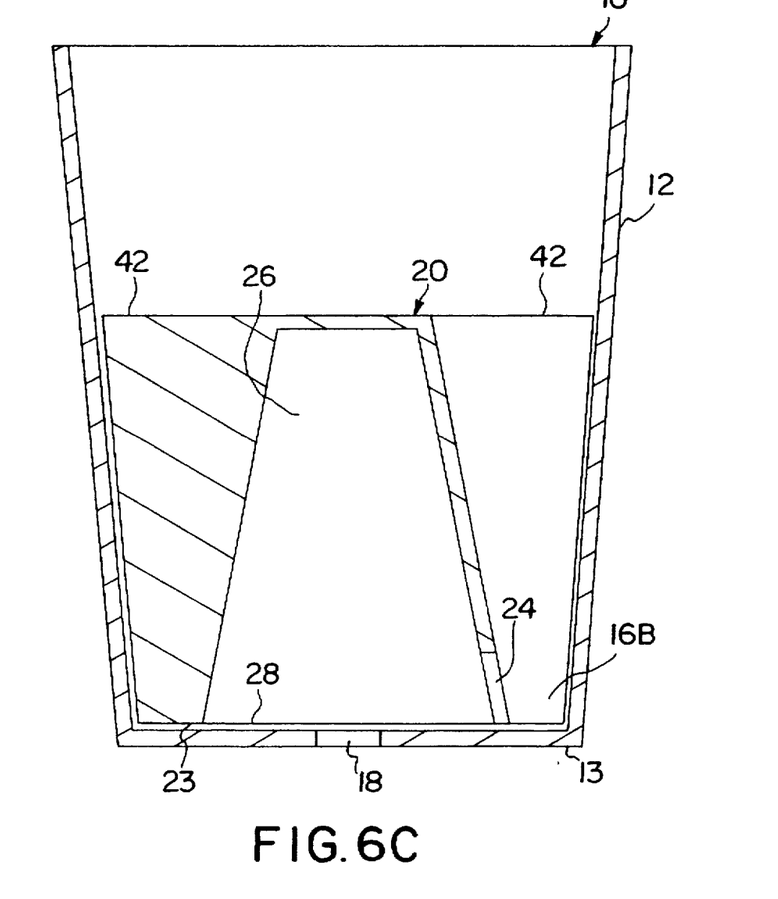
FIG. 6C is a side elevation section through AA of FIG. 6B.

In this alternate embodiment, protrusion 20 and plates 42 are fabricated as a single unit. This device is manufactured with dimensions determined from an appropriately sized conventional plant container. It should fit snugly into the receiving space of the associated container that it has been sized to fit. Alternate embodiments showing this arrangement are shown in FIGS. 6A, 6B and 6C.

An insertable embodiment of a protrusion 20 having root barrier plates 42 combined with a separate conventional plant container provides similar benefits to those described for FIGS. 1 and 2, but in a somewhat less effective package. The main loss is that plates 42 of an insertable device do not provide a perfect barrier to growing roots. Some roots may grow between the container's wall and the outermost edge of plate 42. Such roots would need to be cut when a contained plant was transplanted. Another loss is that protrusion 20 cannot function effectively as a support shaft receptacle, as described in FIG. 9.

An insertable embodiment of a protrusion can be solid or hollow. FIG. 4 shows protrusion 20 as having a hollow interior 26. A plurality of drain notches 24 are set into the bottom edge or base 23 of protrusion wall 22. Notches 24 permit excess gravitational water to escape through notch 24 into protrusion 20's hollow interior 26 and thence via protrusion base opening 28 into a centered floor drain hole in the base of the associated plant container.

The insertable protrusion of FIG. 4 can be fabricated without plates 42. When fabricated without plates it would only provide a plant container with the excess water shedding function.

7.2 FIG. 5

In the preferred embodiment shown in FIG. 1, apex 30 is flat. In alternate embodiments, a protrusion's apex may be pointed or dome shaped or have an even more complex shape.

FIG. 5 shows an alternate embodiment of protrusion apex 30 which has features whose operation securely holds a seedling plant while the plant container is being manipulated, for example when planting the plant. In this alternate embodiment, protrusion apex 30 is formed with a cup shape 32 and apex drain slots or grooves 34 penetrate from the inside of apex cup 32 to the outside of protrusion side wall 22.

Apex features, as exemplified in FIG. 5, can be used with many different embodiments of a protrusion.

7.3 FIGS. 6A, 6B and 6C

In some embodiments a protrusion can be fabricated separately from a container. In some embodiments a protrusion can be solid. In some embodiments a protrusion's base periphery can be smaller than its container's base periphery.

FIG. 6A shows an alternate embodiment of protrusion 20 wherein protrusion 20 is solid, insertable and removable and the protrusion/container juncture is a narrow trough 16B, rather than a sharp syncline. In other words, FIG. 6A's protrusion/container juncture is more like a U than the V like juncture of FIGS. 1 and 2.

In FIG. 6A's alternate embodiment, protrusion base 23 has a smaller diameter than does container base 13. Consequently, the synclinal juncture 16A shown in FIGS. 1 and 2 is widened to create a trough juncture 16B as shown in FIG. 6A. A trough juncture creates an annular floor for container 10 which may provide marginally better stability for the container. Protrusion/container trough juncture 16B may optionally have drain holes 25 which may or may not be accompanied by container wall drain holes.

FIGS. 6B and 6C show an alternate embodiment of a protrusion 20 with plates 42 wherein protrusion 20 is hollow 26. insertable and removable and the protrusion/container juncture is a narrow trough 16B. FIGS. 6B and 6C also show an embodiment with 120 degree symmetry compared with the 90 degree symmetry shown in, say, FIG. 4.

In FIG. 6C, container 10 is shown with a single central drain hole or base opening 18. This arrangement is common with, for example, fired red clay pots. Because protrusion 20 is hollow and fits snugly in container 10, protrusion base opening 28's diameter is considerably greater than container base opening 18's diameter. This assures that protrusion base opening 28 is sufficiently aligned with container base opening 18 to properly drain excess water from container 10.

Protrusion drain notch 24 enables excess gravitational water (iv) to drain out of container 10's soil receiving space into protrusion hollow 26. From there it flows through protrusion base opening 28 into container base opening 18 and so out of container 10.

Protrusion/container trough juncture 16B of FIGS. 6A, 6B and 6C can be used, with appropriate modifications, with many different embodiments of a protrusion.

Figure 7A:
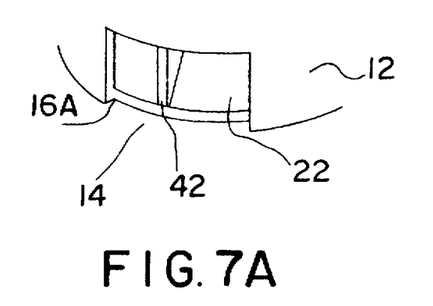
FIG. 7A is a top perspective partial view of the intersection of a plate with a container drain hole at a synclinal juncture.
Figure 7B:
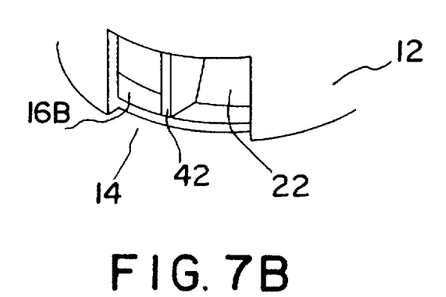
FIG. 7B is similar to 7A but shows the intersection for a trough juncture.
Figure 7C:
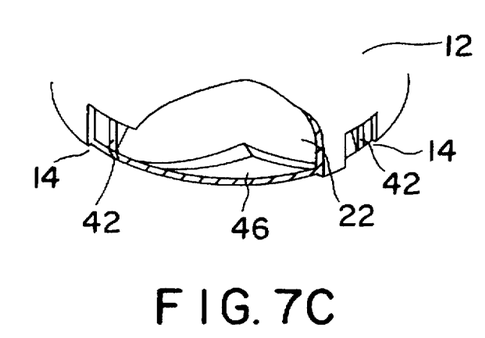
FIG. 7C is a top perspective partial view in partial section of a compartment drain tent.

7.4 FIGS. 7A, 7B and 7C

FIGS. 7A, 7B and 7C show close up details of a protrusion/container base juncture 16 in the vicinity of a container drain hole 14.

FIG. 7A shows details of a protrusion/container synclinal juncture 16A. Protrusion side wall 22 joins container side wall 12 in a V-shaped juncture. Plate 42 is shown intersecting with drain hole 14, thereby dividing it into two portions. Each portion drains a separate compartment 40.

FIG. 7B shows details of a protrusion/container trough juncture 16B. In this case, protrusion side wall 22 joins container side wall 12 in a narrow trough or U-shaped juncture.

FIG. 7C shows details of how a protrusion/container juncture 16A might be further modified to create a drain tent 46. A drain tent 46 will cause gravitational water to flow more easily from locations far from drain holes, such as the center of a compartment 40, towards and then out drain holes 14. Drain tent 46 of FIG. 7C can be used, with appropriate modifications, with many different embodiments of a protrusion.

7.5 FIG. 8

Figure 8:
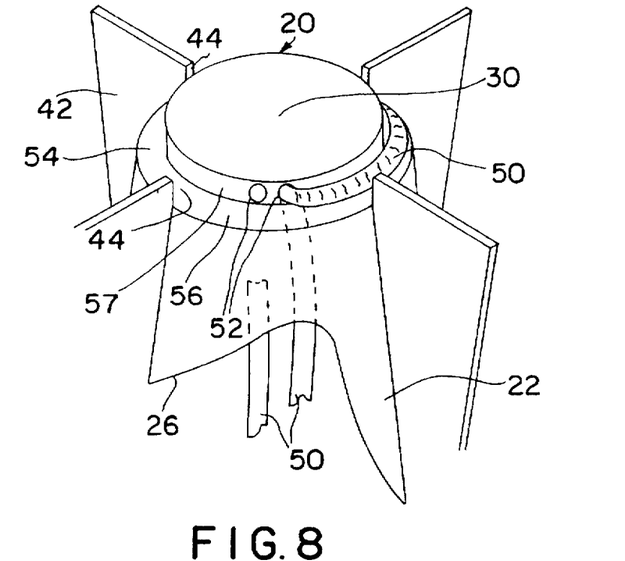
FIG. 8 is a top perspective partial view of a protrusion having plates and wick, wick apertures and wick notch.

FIG. 8 shows an alternate embodiment of protrusion apex 30. This embodiment has additional features that enable automatic supplementary watering of a contained plant. In this alternate embodiment, protrusion 20 is hollow as shown at 26 in FIGS. 1, 2, 8 and 9.

The juncture of protrusion apex 30 and side wall 22 is formed with a groove or notch 54, that receives a cord like wick 50. Wick notch 54 is formed into the circumference of protrusion apex 30 having one side approximately horizontal and the other side approximately vertical. The horizontal side of wick notch 54 acts as a seating surface 56 for wick 50 and the vertical side acts as a positioning guide 57. Plates 42 ascend above seating surface 57 to a height approximately level with apex 30 thereby creating plate slots 44. Plate slots 44 help hold wick 50 in wick notch 54 while a plant container is being manipulated.

Wick 50 is engaged in wick notch 54 on top of seating surface 56 and pulled snugly against positioning guide 57 as it encircles apex 30. Wick 50 passes through plate slots 44 formed by the gap between positioning guide 57 and the innermost edge of plate 42. Wick 50 passes its two ends through wick apertures 52 that penetrate through wick positioning guide 57.

At least one and potentially both ends of wick 50 traverse within protrusion 20's hollow interior 26 to an external reservoir below container 10. This arrangement limits contact between wick 50 and soil held in container 10's receiving space to the vicinity of notch 54 at apex 30. In other words, a soil mass' saturation prone lower boundary and axial volume are protected from the introduction of capillary moisture by protrusion 30. Consequently, major defects associated with the design of most self-watering plant containers are avoided.

The wick receiving features of FIG. 8 can be used, with appropriate modifications, with many different embodiments of a protrusion.

7.5.1 Object (xi)

Protrusion 20, by construction, excludes soil, roots and water from the volume it occupies, thereby eliminating the soaking prone volume of soil axially under a plant's stem.

Apex 30 of protrusion 20 provides an optimal location for wick 50. It is elevated well above the saturated layer adjacent a soil mass' lower boundary. The hollow interior of protrusion 20 provides a protected passageway for wick 50 to drop from protrusion apex 30 to a reservoir located below the plant container.

7.6 FIG. 9

Figure 9:
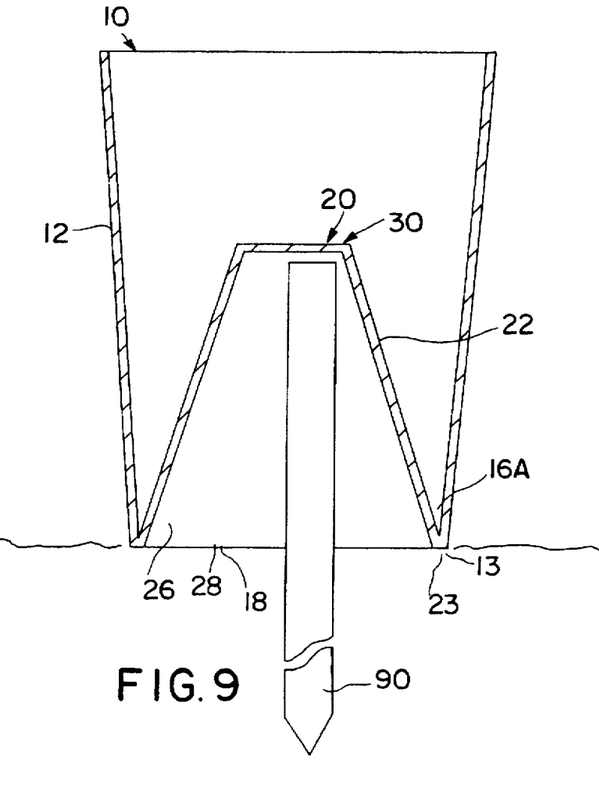
FIG. 9 is a side elevation section of a plant container placed so that an external support shaft engages its hollow protrusion.

FIG. 9 shows an embodiment of protrusion 20 wherein protrusion hollow 26 serves as a receptacle for an external rigid elongate support object or shaft 90. FIG. 9 also shows clearly details of a synclinal juncture 16A for a protrusion 20 and container 10 formed as a single unit. In particular, FIG. 9 shows that for this embodiment protrusion base 23, container base 13 and juncture 16A are all essentially the same feature. Similarly, protrusion base opening 28 and container base opening 18 are also one and the same feature.

7.6.1 Object (xii)

A preferred embodiment of a protrusion 20 is as a hollow 26 vaulted floor of a plant container 10 with an open base 18. Such a protrusion provides a receptacle capable of receiving an elongate upright support shaft 90, such as a stake or post. A stake or post of an appropriate length could be driven into the ground sufficiently deep to be difficult to push over. The stake's above ground projecting length would be slightly less than the height of protrusion apex 30. Plant container 10 with hollow 26 protrusion 20 would then be placed on the ground over the upright stake, as shown in FIG. 9.

Such an arrangement supports the plant and plant container against accidental blowing, pushing or tipping over. Similarly, matrixes with many uprights could be placed in transport vehicles to provide means to protect containers from tipping over while in transit.

7.6.2 Object (xiii)

The above ground length of an upright support shaft 90 could be somewhat longer than the height of protrusion apex 30. A plant container placed over such a support shaft would be held above the ground a small distance. In this case, a snail would have to traverse a difficult path with major obstacles to get to a plant growing in soil in the receiving space.

In particular, a snail would have to: (a) crawl up support shaft 90; (b) bend over backwards to attach itself to the underside of protrusion side wall 22; (c) crawl down side wall 22 to juncture 16; (d) bend under juncture 16 to attach itself to the outside of container side wall 12; (e) crawl up side wall 12 to the top of container 10. Such an obstacle course might deter a small percentage of snails.

Another benefit of holding a plant container off the ground with a support shaft is that there would be superior air circulation around the base of the container.

Support shaft 90 could optionally have a head piece with a diameter slightly smaller than protrusion apex 30. Such a head piece would help stabilize a supported container.

8. SUMMARY

Accordingly, the reader will see that an improved plant container having a protrusion and plates is disclosed. A protrusion's base is generally close in size and shape to the soil receiving space floor area of its associated container. A protrusion's apex is generally much smaller than its base so that a protrusion's side wall slopes upwardly and inwardly from base to apex. A protrusion is generally centered at the bottom of a container's soil receiving space and projects upward into the soil receiving space so that it excludes soil from a certain portion of the soil receiving space. A protrusion so situated:

(a) causes the soil receiving space to be restricted to the periphery in the lower portion of the container; and (b) causes this peripheral ring-like lower portion of the soil receiving space to taper downwardly-to an approximately V-shaped lower boundary.

The centrally excluded downwardly tapering soil receiving space so formed causes soil held within the container to shed more excess water than does soil held within a similar container but having an unconstricted soil receiving space.

A protrusion has plates joined vertically and radially between the protrusion wall and the container wall. The plates partition the peripheral ring-like lower portion of the soil receiving space into separate noncommunicating compartments. Such compartments:

(a) prevent the roots of plants growing in the container from coiling and circling about the perimeter of the soil receiving space; and (b) mold or shape the roots of plants growing in the container into lobes.

The root lobes so formed can be easily splayed out when the plant is transplanted into the ground.

A protrusion can have a hollow interior. A hollow interior enables a protrusion to function as either:

(a) an external support shaft receptacle; or (b) a combination elevated platform and protected passageway for a wick.

In the first case, a plant container having a hollow protrusion is placed over an upright shaft. The shaft engages the protrusion's hollow interior and thereby supports the container against being upset. In the latter case, the wick passes through the protrusion's hollow interior to apertures near its apex, emerges into the soil receiving space and then encircles the apex. The elevated wick position together with the protected path from an external reservoir to the protrusion apex avoids introducing moisture into soil lying in the lower and central portions of the soil receiving space.

9. CONCLUSION, RAMIFICATIONS AND SCOPE OF INVENTION

While my above description contains many specificities, these should not be construed as limitations on the scope of the invention, but rather as an exemplification of certain preferred embodiments thereof. Many other variations are possible. For example, container, protrusion and plates can all be made as separate objects which are assembled by a user. In this case, the inside surface of the container and the outside surface of the protrusion could have matching vertical grooves or slots into which plate members would be inserted. Another example would be fabricating all apertures as punchouts. This arrangement would enable a single design that could be adapted to many different uses. Yet another example would be turning a unitarily constructed container upside down and using the protrusion receptacle to hold soil and a plant. This arrangement would provide a more stable container and a heat insulated soil receiving space. Accordingly, the scope of my invention should be determined not by the embodiments illustrated, but by the appended claims and their legal equivalents.

I claim:

1. A combined excess water shedding root shaping device and plant container, said plant container having a bottom and a continuous side wall which define a receiving space, said receiving space hosting a plant in soil contained therein, said device comprising:

an imperforate frustro-conical protrusion mounted in said plant container, said protrusion having a base, a continuous side wall sloping inwardly away from the plant container side wall, and an apex, said protrusion being joined with the bottom of said plant container, and projecting vertically upward in the center thereof;

a plurality of imperforate vertical plates extending radially from said protrusion, each plate joined along an innermost radial edge to the protrusion side wall and joined along an outermost radial edge to the container side wall and joined along a lowermost edge to the container bottom;

said protrusion and said plates forming open topped non-communicating compartments between each two adjacent plates, the compartments so formed comprising the lower portion of the plant container's receiving space.

2. The device set forth in claim 1, further including a plurality of drain holes penetrating said container side wall adjacent said container bottom, each one of said plates intersecting a respective one of said drain holes.

3. The device set forth in claim 1, wherein the periphery of the protrusion base is disposed within the bottom of said plant container at a distance from the side wall of the container.

4. The device set forth in claim 1, wherein the periphery of the protrusion base meets the side wall of the container.

5. The device set forth in claim 1, wherein said protrusion is hollow, said device further including an opening in said container bottom in the center thereof said opening communicating with the hollow interior of said protrusion.

6. The device set forth in claim 5, further including a wick receiving notch formed circumferentially into said protrusion apex and having a wick aperture defined therein communicating with said wick notch and having a wick wherein said wick emerges from the protrusion's hollow interior through said wick aperture and encircles said protrusion apex in said wick receiving notch.

7. An excess water shedding root shaping device for use with a plant container, said device comprising:

a frustro-conical protrusion having a base, an apex, and a continuous side wall sloping upwardly and inwardly from said base to said apex;

a plurality of imperforate vertical plates extending radially from said protrusion, each plate being joined along an innermost radial edge to said protrusion side wall;

whereby said device can be removably inserted into said plant container.

8. The device set forth in claim 7, wherein said protrusion is hollow.

9. The device set forth in claim 8, wherein the hollow protrusion is imperforate.

10. The device set forth in claim 9, wherein said device and said plant container are made as a single unit.

11. The device set forth in claim 8, wherein the hollow protrusion side wall is penetrated by drain notches adjacent the protrusion base.

* * * * *